United States Patent [19]

Milch

[11] Patent Number: 4,898,467

[45] Date of Patent: Feb. 6, 1990

[54] SPECTROMETER APPARATUS FOR SELF-CALIBRATING COLOR IMAGING APPARATUS

[75] Inventor: James R. Milch, Pittsford, N.Y.

[73] Assignee: Eastman Kodak Company, Rochester, N.Y.

[21] Appl. No.: 267,596

[22] Filed: Nov. 7, 1988

[51] Int. Cl.$^4$ ............................ G01J 3/28; H04N 1/46
[52] U.S. Cl. .................................. 356/328; 356/404; 358/75
[58] Field of Search .............. 356/305, 328, 334, 404; 358/75, 406

[56] References Cited

U.S. PATENT DOCUMENTS

| | | | |
|---|---|---|---|
| 4,544,269 | 10/1985 | Nose et al. | 356/222 |
| 4,595,290 | 6/1986 | Nose et al. | 356/225 |
| 4,650,988 | 3/1987 | Suzuki et al. | 250/216 |
| 4,695,892 | 9/1987 | Mary | 358/225 |

Primary Examiner—Vincent P. McGraw
Attorney, Agent, or Firm—Dennis P. Monteith

[57] ABSTRACT

Spectrometer apparatus, for self-calibrating a color image scanner of the line scanner or area scanner type, comprises a member, having an optical slit, movable into position on an optical axis of the scanner between its polychromatic light source and its focusable lens in a plane occupied by a color image when it is scanned. A diffraction grating is similarly movable onto the optical axis, a given distance from an image sensor of the scanner. The light source illuminates the slit and the diffraction grating disperses transmitted polychromatic light according to its wavelength, forming duplicate spectra off-axis across respective halves of the image sensor, with longer wavelengths being diverted to respectively higher angles.

11 Claims, 4 Drawing Sheets

SPECTROMETER APPARATUS FOR SELF-CALIBRATING COLOR IMAGING APPARATUS

CROSS-REFERENCE TO A RELATED APPLICATION

Reference is hereby made to U.S. patent application Ser. No. 241,687 entitled IMAGE SCANNER APPARATUS OF THE DRUM TYPE HAVING AN EFFICIENT LINE-OF-LIGHT ILLUMINATION SYSTEM, by J. Milch, filed on Sept. 8, 1988.

BACKGROUND OF THE INVENTION

1. Field Of The Invention

The present invention relates to apparatus for calibrating color imaging apparatus. More particularly, the invention relates to spectrometer apparatus for self-calibrating a color image scanner.

2. Description Of The Prior Art

Color image scanning is a process of converting an image, recorded on either a transparency or a reflective print, to an electronic image. Scanning, as such, is commonly employed as a first step in the transmission of an image from one storage medium to another, or in the enhancement or the analysis of the image prior to its transmission.

With an image-bearing sheet held in a given plane, a color image scanner measures the optical density of the image by illuminating the sheet with polychromatic light. Commonly, a color image scanner measures the amount of light in a given color space, e.g. red (R), green (G), and blue (B), transmitted through, or reflected from, the image-bearing sheet. In doing so, the scanner effectively divides the image into discrete picture elements, or pixels, and assigns to each a number or value representing an average density for each color measured. Commonly, the pixels are arranged in rows and columns to form a two-dimensional grid with the density of each pixel corresponding to a relatively small portion of the overall image.

As is appreciated by those skilled in the image scanner art, calibrating the spectral sensitivity of a color image scanner is important to provide accurate reproduction of all colors in the image.

The spectral sensitivity of a color image scanner is determined by the spectral characteristics of a variety of scanner components such as the spectral content and sensitivity of its light source, the spectral transmissivity characteristics of filters, lenses and the like, and the spectral sensitivity of its image sensor. All of these factors, however, are likely to change, component to component, particularly with the use of a scanner over long periods of time. Furthermore, even with complete component stability, an original component may be replaced from time to time with a new component having a somewhat different characteristic.

One commonly employed technique for performing a calibration operation on a color film scanner is to employ a reference photographic film containing a set of standard color patches and to measure the scanner response to each patch. To recalibrate the scanner, each color patch is scanned again and its measured value compared with the corresponding previously recorded response.

This technique suffers from a disadvantage in that a film having standard color patches is expensive. This is particularly a problem for a scanner useable with a variety of film types because a reference film of each type would be required. Furthermore, if a film having standard color patches is not stored under conditions required for stability, an apparent change in scanner calibration may occur that is actually due to a change in film.

SUMMARY OF THE INVENTION

In view of the foregoing, an object of the invention is to provide spectrometer apparatus, for calibrating a color image scanner, of simple design and construction that does not employ a reference film having standard color patches.

This object is achieved by means of self-calibrating specrtrometer apparatus comprising a member defining a relatively narrow optical slit positioned on an optical axis of a color image scanner between a light source and a focusable lens of the scanner in a plane occupied by a color image when it is scanned, and a diffraction grating positioned on the optical axis between the lens and a multi-pixel image sensor of the scanner. The light source illuminates the slit which, in view of its narrow breadth and its position relative to the lens, would be imaged generally only onto an on-axis portion of the image sensor. The diffraction grating, however, serves to disperse the light according to its wavelength, forming duplicate spectra off-axis across respective halves of the image sensor, with longer wavelengths being diverted to respectively higher angles.

Each pixel of the image sensor receives an amount of light energy corresponding to its off-axis position, the repetition frequency of rulings of the grating, and the spectral sensitivity of the scanner itself. Accordingly, knowing the off-axis position of an image sensor pixel and knowing the grating frequency, the profile of light energy across the image sensor is a direct measure of the spectral response of the scanner. The calibrating of the color image scanner, based on its spectral response, can take place in signal processing electronics at the output of the image scanner.

Although the color image scanner can take a variety of forms, self-calibrating spectrometer apparatus, in accordance with the invention, is particularly suitable for use with a film scanner including an image sensor having multiple pixels, for example, a line scanner in which a row (or column) of film pixels is imaged simultaneously onto a linear image sensor or an area scanner in which all film pixels are imaged simultaneously onto an area sensor (a 2-dimensional CCD or the like).

These advantages, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
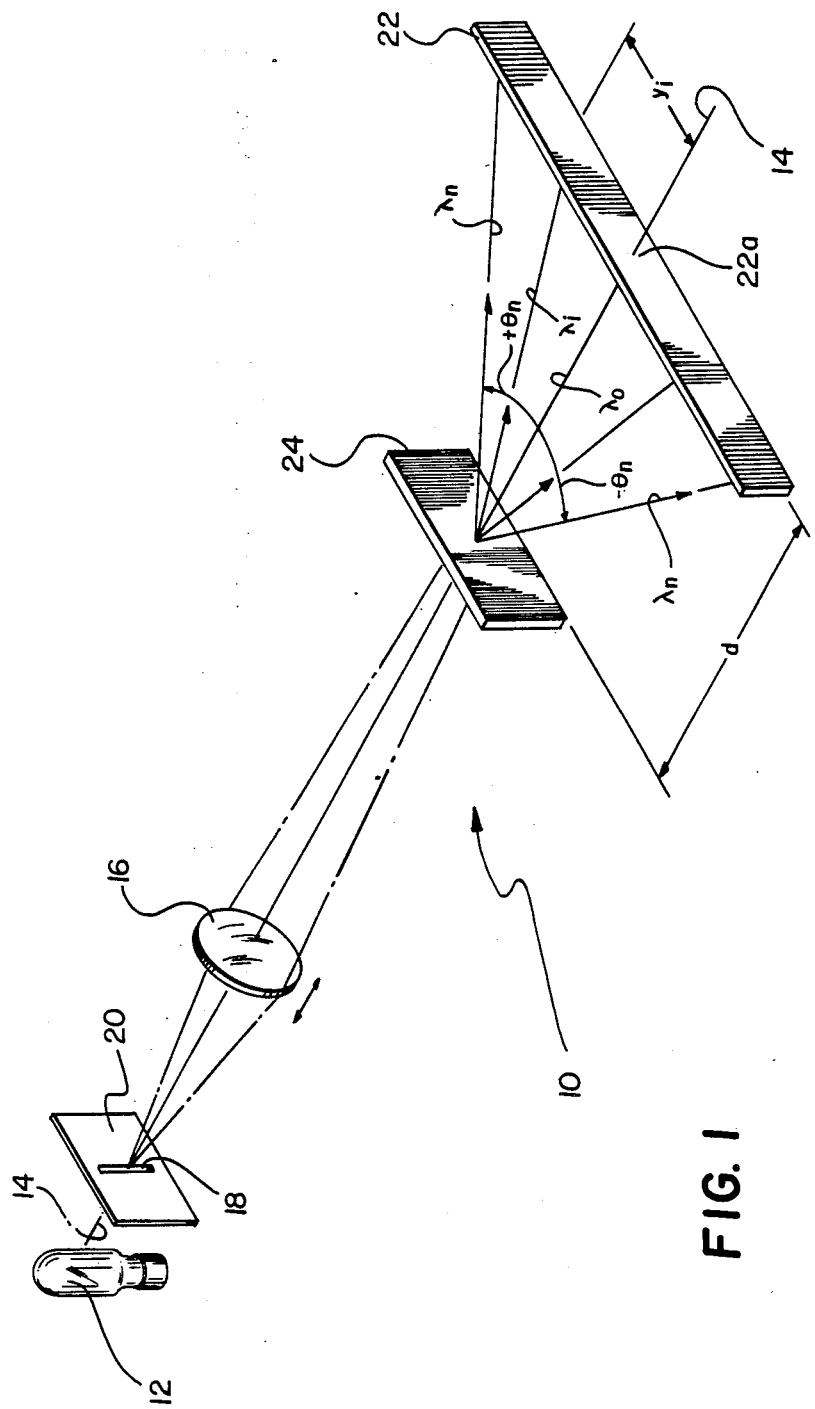
FIG. 1 is a perspective view of spectrometer apparatus in accordance with the present invention.

FIG. 1 illustrates generally self-calibrating spectrometer apparatus 10 in accordance with the present invention. A source 12 serves for projecting light along an optical axis 14. A focusable lens 16 functions to image a relatively narrow slit 18 of a member 20 onto a linear image sensor 22. To that end, the slit 18 is orthogonal to the axis of the image sensor 22 and, as shown, is positioned in an object plane of the lens 16.

The light source 12 illuminates the slit 18. In view of its narrow breadth and location in the object plane, the lens 16 images the slit 18 generally onto only an on-axis pixel 22a of the image sensor 22. A diffraction grating 24, however, located a given distance, d, from the image sensor 22, serves to disperse the light according to its wavelength, forming duplicate spectra (rainbows) across both halves of the image sensor (on either side of the axis 14) with progressively longer wavelengths, $\lambda_i$, being diverted to progressively higher angles.

The image sensor 22 receives an amount of light energy corresponding to its off-axis position, the repetition frequency of rulings of the diffraction grating 24, and the spectral content of the light. More specifically, the diffraction grating 24 disperses light energy across both halves of the image sensor 22 according to:

$\sin \theta_i = \lambda_i f$ where $f$ is the repetition frequency of the grating.

Note that $\sin \theta_i = y_i/(y_i^2 + d^2)^{1/2}$.

Preferably, the grating 24 is an amplitude grating, commonly called a Ronchi ruling, made of clear glass or clear plastic with alternating clear and opaque bars of equal width. To that end, the grating 24 can be made by depositing chrome on glass or it can be made by contact printing a master onto a photographic emulsion.

In operation, one-half of the total light incident the sensor 22 forms an image of the slit 18 on the on-axis pixel 22a. The main beam—"on-axis" light—provides a convenient reference point for measuring the off-axis position of diffracted light.

Most of the other half of the incident light (the diffracted light) is split equally between two first-order spectra formed, respectively, across opposing halves of the image sensor 22. (A small amount of incident light energy is diffracted into corresponding pairs of higher order spectra at progressively greater distances from the axis 14.)

Figure 2:
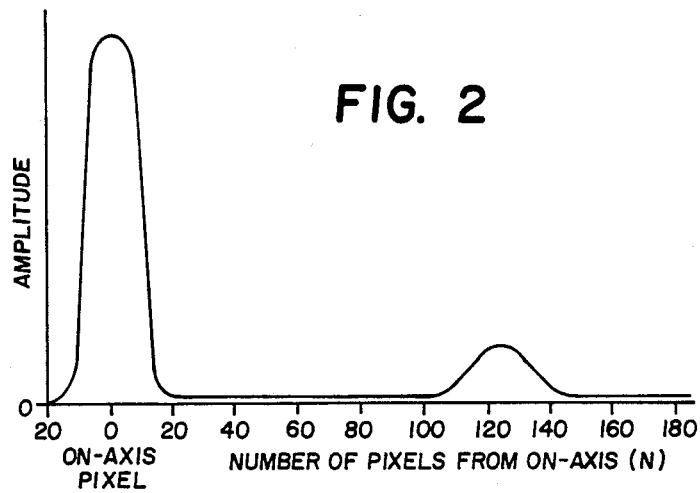
FIG. 2 illustrates the dispersion of green light by diffraction.

FIG. 2 illustrates the dispersion of green light across one half of the image sensor 22 when the distance d is twenty-five (25) millimeters (mm), the grating frequency f is 100 lines/mm, and linear pixel density is 100 pixels/mm.

Apparatus 10 serves advantageously for calibrating color image scanner apparatus of the type including an image sensor having multiple pixels. That is, apparatus 10 functions ideally for calibrating color image scanner apparatus such as a line scanner in which a line of polychromatic light images an original, one entire row (or column) at a time, onto a linear image sensor or an area scanner in which a relatively broad beam of light images an entire original simultaneously onto an area image sensor, e.g. a two-dimensional CCD, etc. When the light source 12, the lens 16, and the image sensor 22 function as components of color image scanner apparatus, they (the light source, lens, image sensor), when combined with a slit and a diffraction grating, perform a dual function by self-calibrating the color image scanner apparatus.

Figure 3:
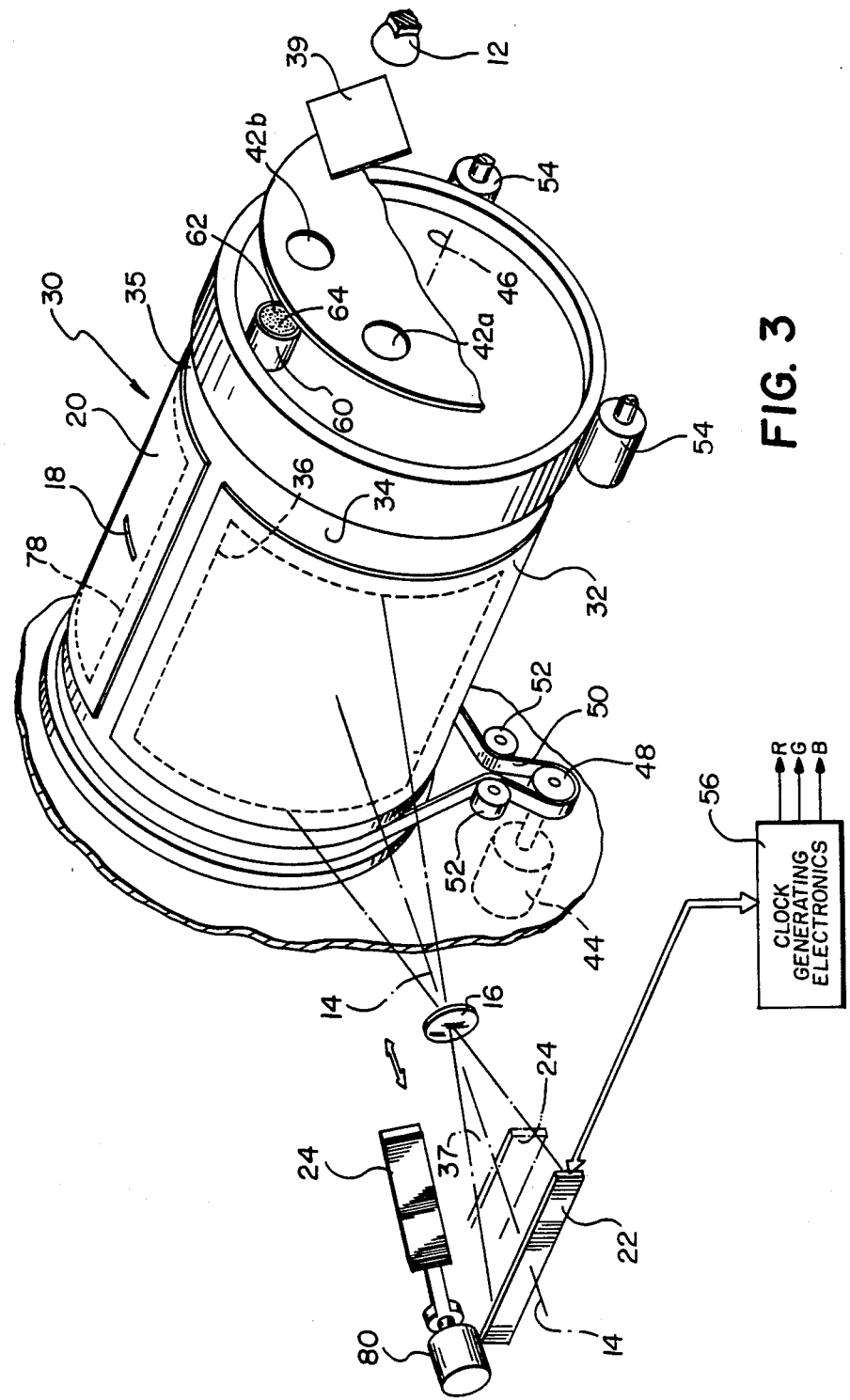
FIG. 3 shows spectrometer apparatus, in accordance with the invention, for calibrating color image scanner apparatus.

FIG. 3 shows color image scanner apparatus 30 of the line scanner type that is ideally suited for calibration by diffraction. Film 32 to be scanned is bent to the curvature of a film-receiving surface 34 of a rotatable hollow drum 35. The drum 35 has an aperture 36 on its curved surface 34 that is larger than the area of the film image. Film-holder means (not shown) serves to mount film 32 with its image in alignment with the aperture 36.

An optical converter (FIG. 4), located inside the drum 35 and described further hereinbelow, projects a line 37 of diffuse illumination through aperture 36—via free space—directly onto the film image. The line of diffuse light illuminates all film pixels in a given row of the image simultaneously.

The aforementioned light source 12, preferably of the tungsten-halogen type, provides polychromatic light used for illuminating film. To that end, a hot mirror 39 functions to block infrared (IR) radiation from impinging on the film 32. A rotatable wheel 40 carries trim filters 42a, 42b which individually serve to balance the amount of red (R), green (G) and blue (B) light produced by the source 12 in accordance with the type of film (negative or reversal) to be scanned.

The entire film image is scanned by moving film 32 one row of pixels at a time through the light line 37. To that end, a stepper motor 44 serves to rotate the drum 35 in small increments about its axis 46. For that purpose, the motor 44 rotates the drum 35 to move the film 32 in a line-scan direction—from the top of a film image to the bottom—via a driven pulley 48 and an endless belt 50 wrapped around the drum in an $\Omega$ configuration. A pair of idlers 52 functions to control belt tension. Rotatable cam followers 54 serve to locate the drum 35.

The aforementioned lens apparatus 16 serves to focus an image of one row of film pixels at a time onto the linear image sensor 22. An operator selects lens apparatus 16 for a variety of magnifications to control the width of a film image scanned.

In a preferred embodiment, the image sensor 22 comprises a charge coupled device (CCD) having an overlay comprising three parallel arrays of color filters—red (R), green (G) and blue (B). This "tri-linear" image sensor 22, which has 8000 pixels for each of the R, G, and B sensors, further includes three corresponding parallel output registers which are coupled respectively to an output of one of the color filter arrays. Thus, the output of one of the registers corresponds to a R video signal, a second register to a G video signal, and the third register to a B video signal.

Clock generating electronics 56 functions to control the sensor 22 and to process its output signals to produce in a known manner a high-resolution video signal corresponding to the film image. The clock generating electronics 56 applies the R, G and B video signals to circuitry (not shown) for subsequent operations, such as to produce positive R, G and B color signals to provide a composite video signal for display on a video monitor (also not shown) or to produce RGB signals for exposing an output film. A tri-linear image sensor array and corresponding clock generating electronics of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

Figure 4:
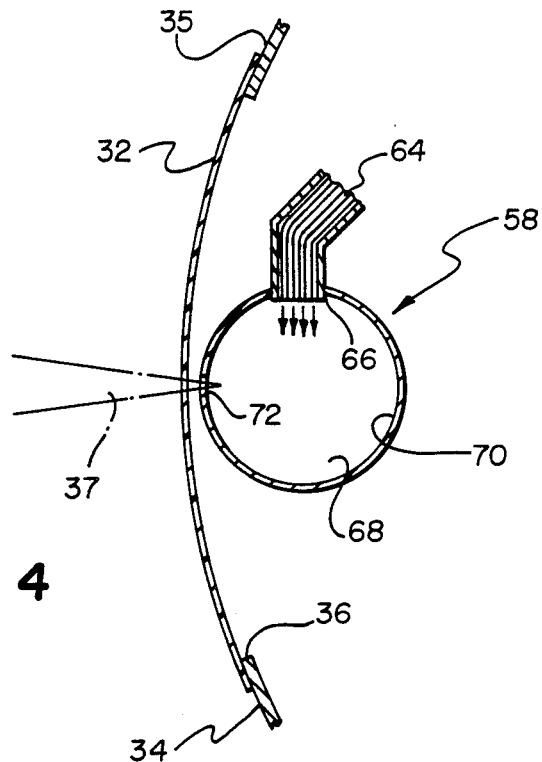
FIG. 4 is a partial side elevation view of the scanner apparatus of FIG. 3 illustrating optical converter apparatus for forming a line of diffuse illumination.

FIG. 4 illustrates the aforementioned converter, denoted 58, for illuminating film 32 with a line of diffuse light projected through the aperture 36. To that end, the converter 58 is located inside the drum 35 between its axis of rotation 46 (FIG. 3) and its surface of revolution.

For the purpose of forming a line of light, a fiber optic bundle 60, shown in FIG. 3, serves to transform a pencil-shape beam of specular light, provided by the source 12, into a flat relatively wide beam, i.e., a beam of generally line-like shape. For that purpose, the input end 62 of the bundle 60 is aligned with the source 12, the diameter of the bundle being substantially equal to the diameter of the specular light beam. The optic fibers, denoted 64, are unbundled inside the drum 35 and arranged with their respective output ends facing downwardly along an elongate rectangular entrance slot 66 of a cylindrical diffusing tube 68. Thus, light from the source 12 is spread out and thereby enters the diffusing tube 68 through the slot 66 which extends longitudinally from one end of the tube to the next.

The tube 68 serves a dual function of diffusing light received and projecting a relatively thin line of such diffuse illumination onto the film image plane of the scanner apparatus 30. To diffuse received light, the inside curved wall 70 of the tube 68 is preferably painted with a diffuse, highly reflective paint.

An elongate rectangular exit slot 72, approximately ninety degrees (90°) from the entrance slot 66 and generally parallel with the axis 46 of the drum 35, serves for directing a line of diffuse illumination toward the film image plane. Light entering through the slot 66 is diffused by reflection off the inside wall 70 and exits through the slot 72.

Two relatively simple operations are performed to convert image scanner apparatus 30 to a calibration mode of operation. First, the slit 18 of the member 20 is aligned with the line 37 of diffuse illumination in a plane occupied by image-bearing film when it is scanned. To that end, the member 20 of the spectrometer apparatus preferably comprises a flexible sheet of optically dense film, with the slit 18 defined by a transparent needle-shaped zone.

The film sheet, which preferably may also include recorded information used for testing the scanner appartus 30, is mounted on the drum 35 in alignment with an aperture 78 of the drum. The stepper motor 44 merely rotates the drum 35 to a given position in which the slit 18 is aligned with the line 37 of diffuse illumination.

The second operation requires that the diffraction grating (the Ronchi ruling) 24 be positioned on the optical axis 14 a given distance from the linear image sensor 22. For that purpose, a rotary solenoid 80 (FIG. 3) or the like serves conveniently for moving the grating 24 to the proper position, shown in phantom, on the axis 14.

The distance d, between the grating 24 and the image sensor 22, is used to calculate dispersion of the grating (grating frequency times distance) directly. Accurate knowledge of the distance d would not be required if the source of illumination constituted a wavelength standard. To that end, a second light source may be provided comprising a spectral lamp, fluorescent lamp, LED, laser, or the like, to provide a spectral reading with a known wavelength for measuring dispersion directly.

Figure 5A:
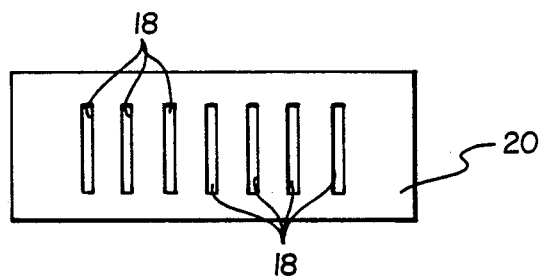
FIGS. 5(a) and 5(b) show alternative embodiments of a member having an optical slit for use with spectrometer apparatus according to the invention.

The calibrating of the spectral sensitivity of color image scanner apparatus by diffraction assumes that the spectral sensitivity of the image sensor is uniform from pixel to pixel. If the image sensor 22 has spectral sensitivity variations from pixel to pixel, these variations can be averaged by imaging several different slits onto the image sensor such that their respective first-order spectra are non-overlapping. FIG. 5(a) shows a member 20 having several spaced slits 18 arranged in a row aligned with the axis of the image sensor. Each slit images first-order spectra simultaneously at respectively different non-overlapping points across the image sensor. Alternatively, a number of different slits, at respectively different on-axis locations, could be imaged sequentially onto the image sensor.

Figure 5B:
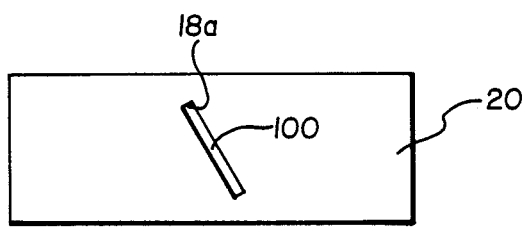

Only a small shift in location between multiple first-order spectra is required to cancel local variations in image sensor sensitivity. To that end, FIG. 5(b) shows the member 20 having a single elongate slit 18a tilted so that it is no longer orthogonal to the axis of the image sensor 22. The stepper motor 44, by changing the rotational position of the drum 35 in small increments, serves conveniently for varying the distance between the center of the slit 18a, denoted 100, and the image sensor 22. A series of sequential spectral measurements can be taken at correspondingly different rotational positions. Pixel-to-pixel sensitivity variations can be reduced by averaging these spectra.

Data collection for a sepctral calibration mode of operation is the same as data collection for scanning an image. The main beam (zero-order spectrum) imaged onto the sensor 22 is the reference point for dispersion data. Spectra on either side of this reference point can be measured and averaged to improve overall accuracy.

Spectral data measured by diffraction is compared with nominal spectral data measured previously from standard color patches of a reference photographic film. A shift in spectral sensitivity can be corrected by means of a calibration matrix in the signal processing electronics.

The invention has been described in detail with reference to the figures; however, it will be appreciated that variations and modifications are possible within the spirit and scope of the invention.

What is claimed is:

1. Spectrometer apparatus for measuring the spectral characteri. ics of color imaging apparatus of the type including a solid state image sensor having multiple pixels, and optical apparatus for projecting light, transmitted via a color image, along an optical axis for illuminating pixels of said image sensor, said spectrometer apparatus comprising:
   (a) a light source;
   (b) a member, defining an optical slit, positionable on the optical axis between said light source and the optical apparatus in a plane occupied by a color image when it is illuminated; and
   (c) a diffraction grating positionable on the optical axis between the optical apparatus and the image sensor to disperse light, projected by the optical apparatus, onto the image sensor, the magnitude and the location of the light impinging upon the image sensor varying as a function of optical characteristics of the color imaging apparatus including the spectral content of said light source and the spectral transmissivity characteristics of the optical apparatus and the image sensor.

2. Spectrometer apparatus as defined in claim 1 wherein said light source produces light of a predetermined wavelength.

3. Spectrometer apparatus as defined in claim 2 wherein said light source is selected from the group consisting of a spectral lamp, a fluorescent lamp, a light emitting diode, or a laser.

4. Spectrometer apparatus for measuring the spectral characteristics of color imaging apparatus of the type having a source of polychromatic light for illuminating a color image, a solid state image sensor having multiple pixels, and optical apparatus for projecting polychromatic light transmitted via the color image along an optical axis for illuminating pixels of said image sensor, said spectrometer apparatus comprising:
 (a) a member, defining an optical slit, positionable on the optical axis between the light source and the optical apparatus in a plane occupied by a color image when it is illuminated; and
 (b) a diffraction grating positionable on the optical axis a given distance from the image sensor to disperse spectral components of the polychromatic light, transmitted by the optical apparatus, onto individual pixels of the image sensor, the respective magnitudes of the spectral components varying as a function of optical characteristics of the color imaging appratus including the spectral content and sensitivity of the light source and the spectral transmissivity characteristics of the optical apparatus and the image sensor.

5. Spectrometer apparatus for calibrating a color image scanner of the type having a source of polychromatic light for illuminating a color image to be scanned, a solid state image sensor having multiple pixels, and lens apparatus for projecting polychromatic light transmitted via the color image along an optical axis for simultaneously illuminating pixels of said image sensor, said spectrometer apparatus comprising:
 (a) a member, defining a narrow optical slit, positionable on the optical axis during a calibrating mode of operation between the light source and the lens apparatus in a plane occupied by a color image when it is scanned; and
 (b) a diffraction grating positionable on the optical axis during the calibration mode of operation a given distance from the image sensor to disperse spectral components of polychromatic light, projected by the lens apparatus, onto individual pixels of the image sensor, the respective magnitudes of the spectral components varying as a function of the optical characteristics of the color image scanner including the spectral content and sensitivity of the light source and the spectral transmissivity characteristics of the lens apparatus and the image sensor.

6. Spectrometer apparatus as defined in claim 5 wherein said member comprises a film having an optical slit defined by a transparent needle-shaped zone.

7. Spectrometer apparatus as defined in claim 6 wherein the image sensor is a linear sensor and said film has an optical slit oriented so that it is non-orthogonal to the axis of the image sensor.

8. Spectrometer appratus as defined in claim 7 wherein the color image scanner includes a drum on which an image to be scanned is mounted, and said film is mounted on the drum co-planar with an image to be scanned.

9. Spectrometer apparatus as defined in claim 8 wherein during the calibration mode the drum is sequentially rotated to position the optical slit in a plurality of discrete predetermined positions relative to the image sensor, each position of the optical slit changing the respective locations at which corresponding spectral components of the light are imaged onto the image sensor.

10. Spectrometer apparatus as defined in claim 5 wherein the image sensor is a linear sensor and said member comprises a film having a plurality of optical slits arranged in a row aligned with the axis of the image sensor.

11. Spectrometer apparatus as defined in claim 10 wherein the optical slits are spaced relative to each other to cause each slit to image first-order spectra onto the image sensor that are non-overlapping with respect to the first-order spectra imaged by each of the other optical slits.

* * * * *